United States Patent [19]

Tanaka

[11] Patent Number: 4,737,064
[45] Date of Patent: Apr. 12, 1988

[54] DUMPING APPARATUS FOR A BAG FILLED WITH A MOLTEN MATERIAL

[76] Inventor: Sokichi Tanaka, 1106 Noa-Shibadaimon 404 Shiba-Daimon 1-chome, Minato-Ku Tokyo, Japan

[21] Appl. No.: 878,158
[22] Filed: Jun. 25, 1986
[51] Int. Cl.⁴ ............................................. B65G 65/34
[52] U.S. Cl. .................................... 414/421; 198/586
[58] Field of Search ................ 414/421, 431; 198/782, 198/586, 574

[56] References Cited

U.S. PATENT DOCUMENTS

| | | | |
|---|---|---|---|
| 1,487,076 | 3/1924 | Pilley | 414/421 |
| 2,413,900 | 1/1947 | Abbott | 414/421 |
| 3,863,788 | 2/1975 | Meyer | 414/421 X |
| 4,056,186 | 11/1977 | Hill | 198/586 X |
| 4,370,087 | 1/1983 | Shepard | 414/421 |
| 4,588,349 | 5/1986 | Reuter | 414/421 X |

Primary Examiner—Peter A. Aschenbrenner
Attorney, Agent, or Firm—Sughrue, Mion, Zinn, Macpeak and Seas

[57] ABSTRACT

A dumping apparatus for dumping a bag 26 filled with a molten material such as asphalt latex which minimizes damage to or leakage of contents out of the bag. The apparatus includes a tippler 1 on which a transport can 27 containing a bag therein is carried. The tippler is advanced and rotated to tilt and move the can onto a pallet 36 and then retracted and rotated back to move the can to its initial position whereupon the bag is pulled out of the can. In synchronism with the advancing and retracting movement of the tippler, a conveyor 30 on which the pallet is carried is moved toward and then away from the tippler. Thus, the bag partially placed on the pallet is pulled by and hence smoothly transferred onto the pallet as the latter is moved away from the tippler together with the conveyor.

3 Claims, 3 Drawing Sheets

DUMPING APPARATUS FOR A BAG FILLED WITH A MOLTEN MATERIAL

BACKGROUND OF THE INVENTION

This invention relates to a dumping apparatus for transferring a bag filled with a molten material from a transport can or container carried on a tippler onto a pallet.

A known dumping apparatus of this type is disclosed in Japanese Kokai No. 40-4878, wherein a transport can in which a bag filled with a molten material is contained is placed on a tippler, and the tippler is then advanced and rotated to tilt and move the can onto a pallet. The tippler is then retracted and rotated back to return the can to its initial position, whereupon the bag filled with a molten material is pulled out of the transport can and left on or transferred onto the stationary pallet.

When a bag filled with a molten material is to be pulled out of a transport can by the advance and return movement of the can in order to transfer the bag onto a stationary pallet as described above, because a molten material such as asphalt latex filled in the bag has a great weight, part of the bag (i.e. bottom) which still remains in the can at an initial stage of the return movement of the can is lifted while slidably engaging with a mouth edge of the can and is then dropped suddenly onto the pallet when it reaches a certain height. Thus, by a combined effect of an impact by such dropping and sliding engagement of the bag as well as deterioration in the strength of the bag due to the heat of the molten material filled therein, the bag may become damaged and hence the molten material may flow out of the bag.

SUMMARY OF THE INVENTION

It is an object of the present invention to provide a dumping apparatus for a bag filled with a molten material which can eliminate sliding contact and lifting movement of part (bottom) of a bag with and by an edge of a mouth of a can to eliminate the problems described above.

According to the present invention, a dumping apparatus for dumping a bag filled with a molten material of the type wherein a tippler on which a transport can containing a bag filled with a molten material is carried is advanced and rotated to move and tilt the transporting can onto a pallet and is then retracted and rotated back to return the can to its initial position, whereupon the bag is pulled out of the can and is transferred onto pallet at a transferring station, comprises a conveyor for carrying the pallet within a predetermined transport range at the transferring station, and an actuator for moving the conveyor in a direction toward and away from the tippler.

Accordingly, because the pallet is moved away from the transport can together with the conveyor in synchronism with the return movement of the can, a bag filled with a molten material such as a paper bag filled with asphalt latex or the like can be pulled smoothly out of the can. Therefore, possible damage to a bag which may be caused by lifting of the bag by the return movement of the transport can is effectively prevented.

DETAILED DESCRIPTION OF THE PREFERRED EMBODIMENT

Now, an embodiment of the present invention will be described in detail with reference to the accompanying drawings.

Figure 1:
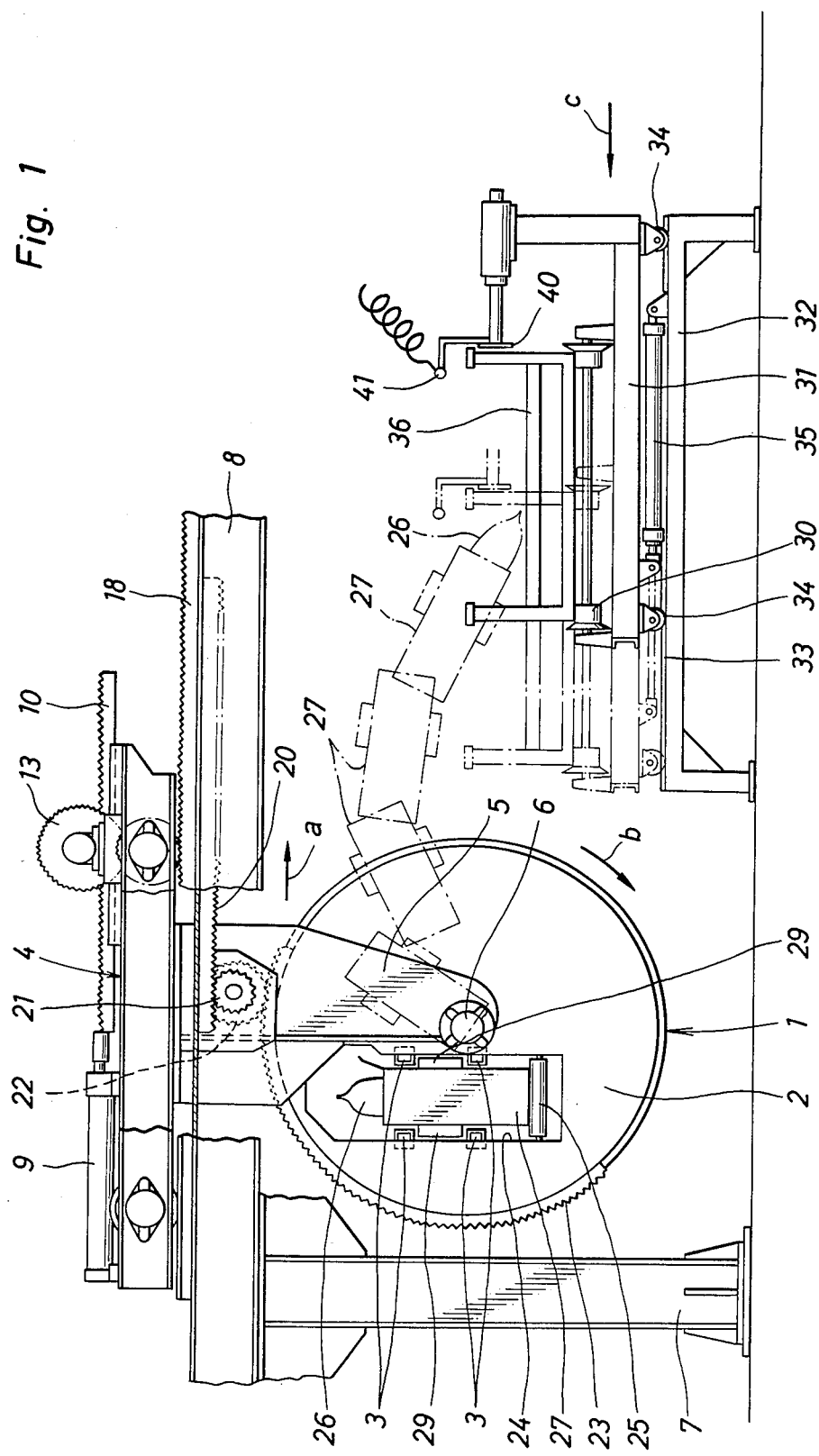
FIG. 1 is a side elevational view of a dumping apparatus for a bag filled with a molten material according to an embodiment of the present invention.
Figure 2:
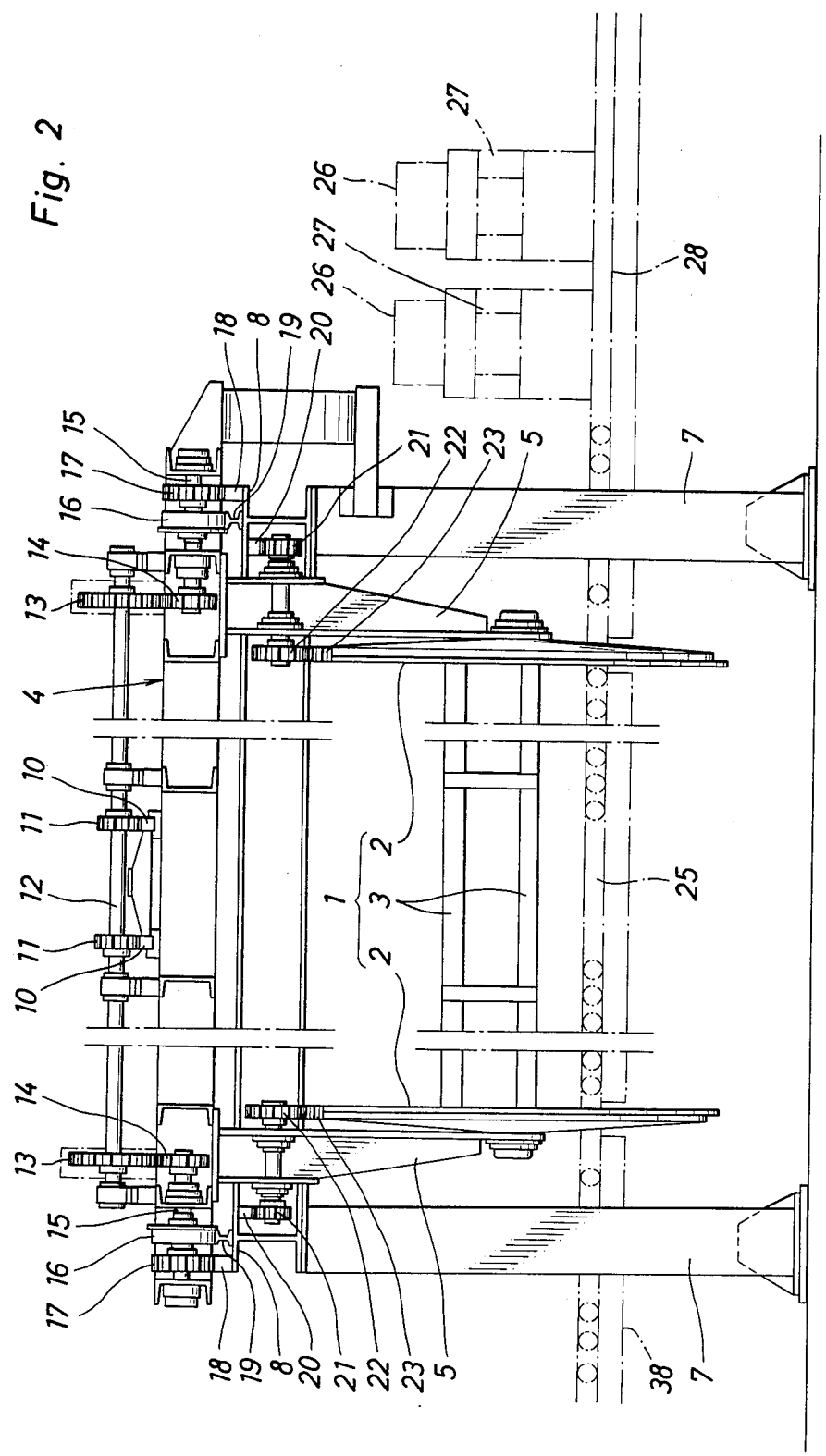
FIG. 2 is a front elevational view of the dumping apparatus of FIG. 1.

Referring first to FIGS. 1 and 2, a tippler 1 includes a pair of left and right disks 2 connected in an opposing relationship to each other by means of a plurality of horizontal rods 3 and mounted for rotation on a pair of left and right shafts 6 journaled in a pair of left and right bearing arms or supports 5 which are in turn mounted on and extend downwardly from a travelling frame 4.

The frame 4 extends between a pair of left and right beam members 8 mounted on support posts 7 and travels horizontally back and forth in a self-propelled manner on the beam members 8. In particular, a hydraulic cylinder 9 is mounted on the travelling frame 4, and as it operates, a pair of racks 10 connected to a piston rod of the hydraulic cylinder 9 are moved in a forward or backward direction. Such movement of the racks 10 is transmitted to move the traveling frame 4 in the forward or backward direction (in a direction of arrow a in FIG. 1) by way of a rotation transmitting mechanism installed on the frame 4. The rotation transmitting mechanism includes a pair of pinions 11 held in meshed engagement with the racks 10, a rotary shaft 12 on which the pinions 11 are mounted, a pair of left and right gears 13 fixed to opposite ends of the shaft 12, another pair of left and right gears 14 in mesh with the gears 13, and a pair of left and right wheels 16 and pinions 17 mounted on a common shaft 15 on which the gears 14 are mounted. The pinions 17 mesh with a pair of racks 18 laid on the beam members 8 so that as they are rotated, the wheels 16 are rolled on and along a pair of rails 19 laid on the beam members 8 to thus move the travelling frame 4 in the forward or backward direction.

A further pair of racks 20 are fixedly mounted on lower faces of the left and right beam members 8 and mesh with a pair of pinions 21 supported for rotation on the bearings 5. Another pair of left and right pinions 22 are mounted in coaxial relationship with the pinions 21 and mesh with a pair of arcuate racks 23 formed on outer circumferential peripheries of the disks 2 of the tippler 1. Accordingly, when the travelling frame 4 advances, the tippler 1 is rotated in a direction of arrow b in FIG. 1, and on the contrary when the frame 4 retreats, the tippler 1 is rotated back in an opposite direction.

Each of the disks 2 of the tippler 1 has a vertically elongated window opening 24 formed therein, and a can positioning roller conveyor 25 is located between and extends perpendicularly to the disks 2.

A transport can 27 adapted to accommodate a paper bag 26 filled with asphalt latex is fed into the dumping apparatus by a roller conveyor 28 as shown in FIG. 2, and after passing through the window opening 24 in the right disk 2, it is transferred onto the roller conveyor 25 between the front and rear horizontal rods 3 of the tippler 1. When it is detected that a predetermined plurality of cans 27 have been placed on the conveyor 25, the hydraulic cylinder 9 operates to extend itself to advance the travelling frame 4 and rotate the tippler 1 in the direction of arrow b. In this instance, the cans 27 are engaged at projections 29 formed on front and rear faces thereof with the front and rear horizontal rods 3, and hence as the tippler 1 is rotated, the cans 27 are lifted and turned by the horizontal rods 3 together with the tippler.

Figure 3:
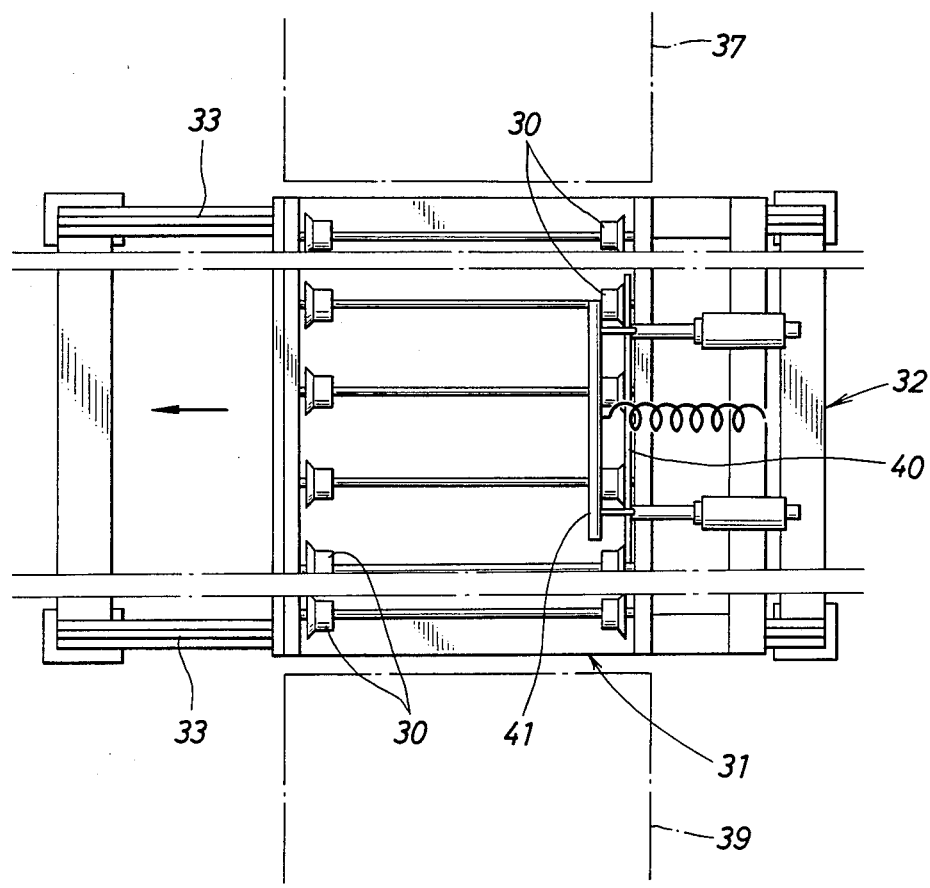
FIG. 3 is a plan view of a roller conveyor for positioning a pallet.

Meanwhile, a pallet positioning roller conveyor 30 is located on another travelling frame 31 forwardly of the tippler 1. The frame 31 has a set of wheels 34 mounted thereon and adapted to be rolled along a pair of rails 32 laid on a base frame 33 as seen in FIGS. 1 and 3. A pneumatic cylinder 35 acting as an expandable actuator is connected to the travelling frame 31 so that as the pneumatic cylinder 35 operates, the frame 31 is moved on the base frame 32 toward (in a direction of arrow c) or away from the tippler 1. Normally, the frame 31 is held at a retracted position remote from the tippler 1 (i.e. a home position) as seen in full lines in FIG. 1.

The roller conveyor 30 receives, at the home position of the travelling frame 31, one after another of pallets 36 fed thereto by a roller conveyor 37.

When the hydraulic cylinder 9 operates to move the tippler 1 forwardly and rotate it as described above, the pneumatic cylinder 35 simultaneously operates to move the roller conveyor 30 forwardly toward the tippler 1 to a position as shown in phantom in FIG. 1 with a pallet 36 carried thereon. Accordingly, the cans 27 are each tilted downwardly at a position just above the top of the pallet 36 and hence the paper bags 26 in the cans 27 will slide outwardly and gradually project from the cans 27 until parts thereof (i.e. parts of the paper bags 26 projecting from the top openings of the cans) abut with the top of the pallet 36. Then, the hydraulic cylinder 9 operates to retract the tippler 1 while rotating it back to its initial position to return the cans 27 to their initial upright positions, and simultaneously the air cylinder 35 operates to contract itself so that the pallet 36 is retracted from the tippler 1 together with the roller conveyor 30. Accordingly, the paper bags 26 are drawn by the pallet 36 in a direction opposite to the direction of movement of the cans 27, and as a result they are pulled smoothly out of the cans without being lifted by the latter and are thus transferred onto the pallet 36.

After the tippler 1 has been returned to its home position, the emptied cans 27 are transferred onto a can carrying out roller conveyor 38 (FIG. 2) through the window opening 24 in the left disk 2 of the tippler. Meanwhile, after the roller conveyor 30 has been returned to its home position, the pallet 36 on which the paper bags 26 have been dumped is transferred onto a pallet carrying out roller conveyor 39 (FIG. 3).

Referring to FIGS. 1 and 3, a bag stopper 40 is located on the travelling frame 31 for preventing the paper bags 26 to be transferred onto the pallet 36 from being dropped therefrom. A sprayer 41 for spraying water over the paper bags 26 on the pallet 36 is mounted on the stopper 40.

What is claimed is:

1. A dumping apparatus for dumping a bag (26) filled with a molten material onto a pallet (36), comprising: a tippler (1), including means (3) for temporarily retainingly engaging a transport can (27) containing a bag filled with a molten material, means (4) for advancing and rotating the tippler to attendantly move and tilt an engaged transport can onto a pallet disposed at a transfer station, and for retracting and rotating the tippler back to its initial position to return the transport can to an initial, upright position, a conveyor (30) for supporting the pallet at the transfer station, and an actuator (35) for moving said conveyor and thus the pallet in synchronism with the tippler and in a direction toward said tippler during the advancing and rotating of the tippler such that the bag progressively slides out of the can and into engagement with the pallet, and away from the tippler during the retracting and rotating thereof such that the bag is drawn fully out of the can and onto the pallet.

2. A dumping apparatus according to claim 1, wherein said conveyor extends perpendicularly to the direction of movement thereof, and a pair of further conveyors (37, 39) are provided adjacent opposite ends of said conveyor for transporting empty pallets into and filled pallets out from said conveyor.

3. A dumping apparatus according to claim 1 or 2, wherein said advancing and retracting means comprises a travelling frame on which said conveyor is mounted, said frame being in turn mounted for movement on and along a pair of stationary rails (19) flanking said tippler.

* * * * *